Feb. 20, 1962 DU BOIS EASTMAN 3,022,156
PROCESS FOR REDUCTION OF IRON ORE
Filed Sept. 14, 1953
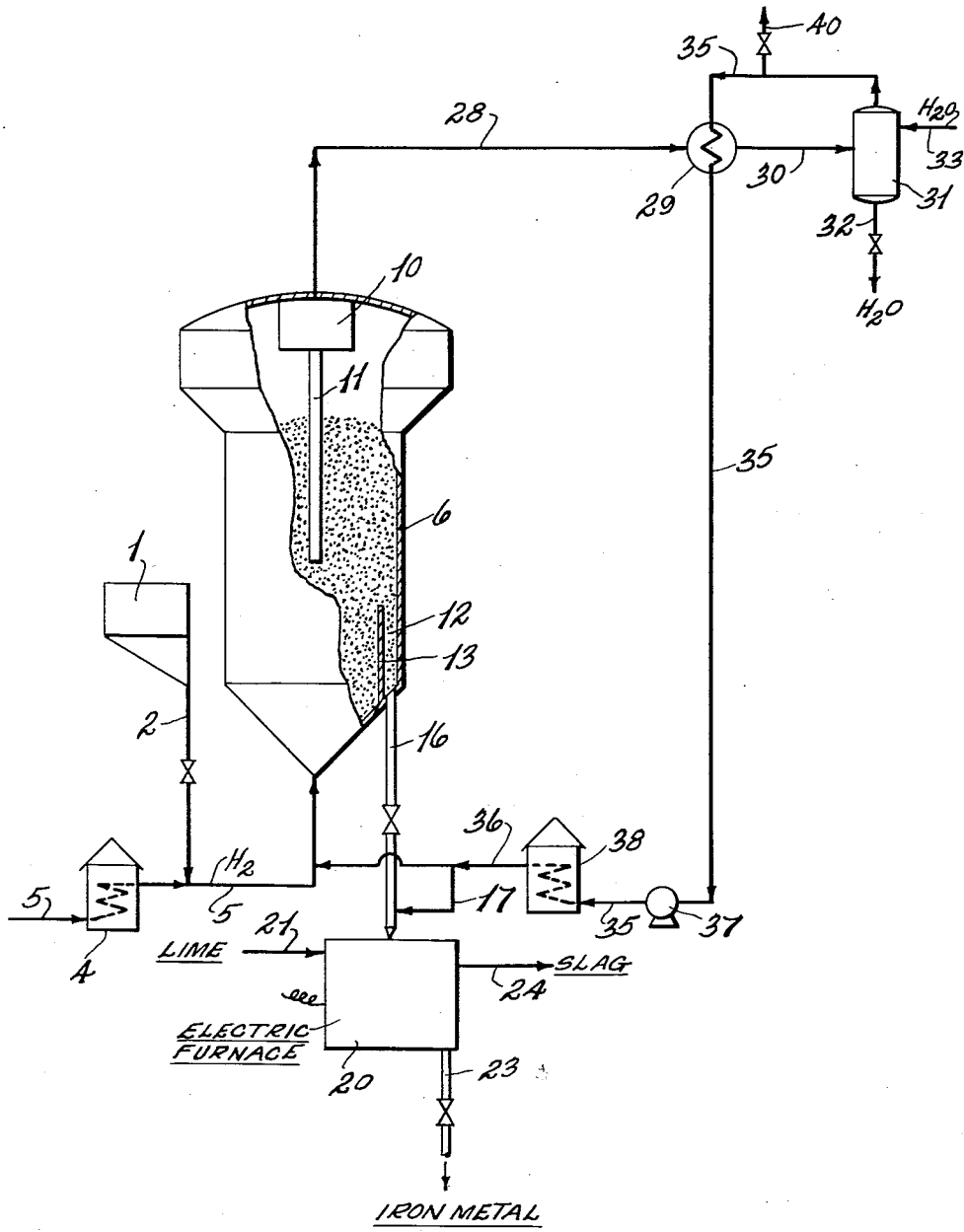

United States Patent Office 3,022,156
Patented Feb. 20, 1962

1

3,022,156
PROCESS FOR REDUCTION OF IRON ORE
Du Bois Eastman, Whittier, Calif., assignor to Texaco Inc., a corporation of Delaware
Filed Sept. 14, 1953, Ser. No. 379,861
6 Claims. (Cl. 75—26)

This invention relates to a process for reducing iron ore to a high-purity iron with hydrogen. The invention involves the discovery of the critical conditions necessary for successful continuous operation of a commercial process for producing iron by reduction of oxidic iron ore with hydrogen.

The present invention involves the discovery that successful continuous commercial reduction of iron ore to metallic iron in a fluid bed can be effected with hydrogen by careful control and selection of the critical operating conditions of temperature, pressure, hydrogen purity and recycle ratio. In accordance with this invention, iron ore in particle form is reduced to metallic iron by reaction with hydrogen of minimum purity of 90 percent at a temperature between 700 and 1,050° F., at a pressure between 350 and 650° p.s.i.g. and at a recycle ratio of reactor effluent to fresh hydrogen of at least 5.

The successful continuous production of iron from iron ore with hydrogen as a reducing agent has five essential requirements. The first requirement is that the reduction must be effected in a fluid bed operation to maintain isothermal conditions in the reaction bed and provide the required endothermic heat of reaction. Secondly, the reduction must be effected at a temperature between 700 and 1,050° F. to maintain an adequate reaction rate and prevent defluidization of the fluid bed operation by sintering and aggregation of the iron ore particles. The third essential requirement is that an elevated pressure in the range of 250 to 650 p.s.i.g. must be maintained during the reduction. The fourth essential requirement is that the hydrogen employed for the reduction have a minimum purity of 90 percent. The final necessary condition that must be observed is that a high recycle ratio of recycle gas to fresh feed be maintained; a minimum recycle ratio of 5 is prescribed, but normally a recycle ratio between 6 and 15 is employed.

All types of oxidic iron ores can be reduced to metallic iron by the hydrogen reduction process of this invention. High grade Mesabi iron ore containing approximately 8 percent silica is, of course, a preferred charge material, but mill scale containing less than 1 percent silica, and blast furnace flue dust containing about 5 percent silica, are easily handled by the process of the invention. Hematite, limonite and roasted pyrites may also be used as charge material. In general, all iron ores in which the iron is predominantly in the form of oxides are handled by the process of the invention. A preferred charge material comprises ore whose silica content is below 15 percent. Although reduction of the ore to metallic iron is not hindered by a high silica content, a low silica content in the reduced ore expedites separation of metallic iron from the slag.

An advantage of using an ore whose silica content is below 15 percent as a charge material is that the amount of lime added during separation of the metallic iron from the slag in an open hearth furnace or an electric furnace is substantially reduced. Lime is normally added in both the open hearth furnace and electric furnace operations wherein the reduced ore is melted and the denser molten iron separated from the lighter molten slag and other impurities. Beneficiation of iron ores to a low silica content can be effected either by magnetic means or by a flotation process.

Beneficiation of magnetic iron ores to a silica content less than 15 percent is simply effected by a process involving magnetic separation of finely ground ore. Magnetic separation is particularly useful in converting taconite, which has a high silica content, to charge material for the reduction process of the invention; this process is currently being used to prepare taconite for charging in a blast furnace. Taconite is finely ground so that 100 percent passage through a 200 mesh screen and 75 percent passage through a 325 mesh screen is effected; the finely divided taconite is then subjected to magnetic separation whereby the silica content of the ore is reduced to between 6 and 10 percent. The resulting finely ground low silica content taconite can be charged directly to the hydrogen reduction process of this invention. In the blast furnace operation, it is necessary to sinter the finely ground beneficiated taconite with coke to produce lumps of about ½" to 1" in diameter, but this step is not necessary in the hydrogen reduction process because finely divided material can be handled in the fluid bed hydrogen reduction process.

Non-magnetic iron ores such as jasper can be beneficiated by a flotation process wherein silica is separated from the finely ground ore. Although the flotation means of separation is more troublesome and expensive than the afore-described magnetic separation, is is possible to reduce the silica content of non-magnetic ores to 15 percent or below thereby.

The process of this invention can handle particles ranging from 10 to 3,000 microns so that the expense of the sintering operation for handling beneficiated taconite or flue dust is eliminated.

It has been discovered that, contrary to expectation, more rapid reduction of the iron ore to metallic iron is effected with ore particles in the upper portion of the prescribed 10 to 3,000 micron particle size range than with more finely divided particles. As a general rule, in chemical conversions the rate of reaction increases with decreasing particle size. However, in the hydrogen reduction of iron ore, a 25 to 50 percent higher rate of reduction is realized with particles having an average size within the range of 100 to 3,000 microns than with smaller particles having an average particle size between 10 and 100 microns. A particularly surprising and rapid rate of reduction is noticed with ore particles having a particle size within the range of 150 to 2,500 microns.

Iron ore requires no further pretreatment prior to use in the process of this invention. There is no necessity of adding any promoter to increase the rate of hydrogen reduction or hydrogen utilization. High grade Mesabi ore, hematite, limonite, magnetite and flue dust can be charged directly to the hydrogen reduction process. Taconite and jasper are ready for use in the process of the invention without the addition of any promoter or without the sintering required for its utilization in blast furnace operation. However, as has been indicated previously, high silica ores, such as jasper and taconite, are normally beneficiated before use in the process of the invention.

The fluid bed operation required for effecting reduction of iron ore in the process of this invention is widely employed in the catalytic cracking art and in the production of synthetic fuel by the catalytic reaction of hydrogen and carbon monoxide. In a fluid bed operation, the gas velocity is correlated with the particle size and density of the solid material so as to maintain the finely divided solid in a dense turbulent state simulating a boiling liquid. The finely divided solids undergo extensive vertical and horizontal motion, and assume a pseudo-liquid level with the result that there is minimum removal of finely divided solids from the reaction zone in the effluent gas.

Maintenance of the iron ore in the form of a fluid bed during reduction with hydrogen is assured by passage of hydrogen through a bed of iron particles which have been ground to particle size falling in the range of 10 to 3,000 microns at a superficial linear velocity falling in the range of 0.5 to 5 feet per second. Superficial linear velocity defines the gas velocity as if there were no solid present in the reaction zone. Since the fluid density of the ore is in the neighborhood of 100 to 200 pounds per cubic foot, solids carryover is minimized by passage of the hydrogen through a bed of iron particles of the aforedescribed particle size range at the prescribed linear velocity. The precise hydrogen linear velocity within the prescribed range selected for each particular operation depends upon the density and state of subdivision of the particular ore to be treated. There is no need to delineate the conditions required for the maintenance of a fluid bed further because the prior art well teaches how a fluid bed operation is maintained by correlation of particle density, particle size and gas velocity.

Although equilibrium data indicate that maximum conversion of iron oxides to metallic iron with hydrogen is effected at a temperature above 1,500° F., it has been discovered that it is necessary to utilize temperatures between 700 and 1,050° F. and preferably between 850 and 1,000° F. in order to effect successful continuous reduction of iron ore to metallic iron with hydrogen. At temperatures above 1,050° F., it is impossible to maintain fluid bed type operation because the ore particles sinter and form aggregates with accompanying defluidization. Once defluidization of the iron ore metallic iron system occurs, it is impossible to supply the necessary heat to the reaction zone with the result that reduction of iron oxide to iron soon reaches a standstill. However, when the reduction is effected within the prescribed temperature range and the other critical operating conditions are observed, a fluid bed operation is readily maintained and there is no evidence of sintering or aggregation.

Use of a hydrogen pressure between 250 and 650 p.s.i.g. and preferably between 400 and 550 p.s.i.g. is one of the most critical factors in making fluid bed hydrogen reduction of iron ore a feasible operation. In addition to being a substantial factor in maintaining fluidization and in decreasing the size of the reaction vessels, use of pressures within the prescribed range simplifies removal of water of reaction from the effluent hydrogen stream prior to its recycle and minimizes the effect of the pressure drop accompanying the reduction reaction. If pressures above the prescribed range are employed, there is serious danger of equipment failure as a consequence of metal embrittlement by the action of hydrogen.

It is necessary to remove water of reaction from the recycled hyrogen stream in order to prevent water from acting as an oxidizing agent in the recycled gas stream. Because of its action as an oxidizing agent, the water content of the recycled hydrogen stream should be reduced below 1 percent in the recycle hydrogen. If pressures lower than the prescribed 250 to 650 p.s.i.g. prescribed range are employed in the reduction, extensive refrigeration is required in order to bring the water content of the recycle gas below the prescribed 1 percent maximum concentration. When the prescribed pressure is employed, the water content of the recycled gas stream can be reduced below the 1 percent maximum level without refrigeration.

Another factor that necessitates the employment of the prescribed pressure level is that the repressuring of the recycle gas stream to overcome the pressure drop occurring in the reaction and water removal zones is economically effected at pressures within the prescribed 250 to 650 p.s.i.g. range. At lower reaction pressures, the power required to offset an equivalent pressure drop is substantially greater than at the prescribed reaction pressure. The difference is so significant as to be a substantial economic factor.

The use of the prescribed 250 to 650 p.s.i.g. pressure range is one of the most important factors in realizing successful commercial reduction of iron ore with hydrogen. The use of the prescribed pressures has a four-fold effect: The reactor size is substantially reduced; maintenance of a fluid bed is materially aided; the necessary removal of water from the recycled hydrogen stream is effected without refrigeration; and repressuring of the recycled gas to offset the pressure drop in the system is made economically feasible. One of the principal reasons for the failure of previous efforts to make hydrogen reduction of iron ore a successful economical operation was the non-recognition by prior investigators of the importance of the prescribed pressure range.

Successful commercial hydrogen reduction of iron ore requires hydrogen having a purity of over 90 percent. The 90 percent figure is an absolute minimum, and hydrogen of better than 95 percent purity is generally used in the fluid bed reduction of iron ore with hydrogen. It is necessary that hydrogen of the prescribed purity be used in the process of the invention in order to prevent excessive hydrogen loss in the venting operation used to purge impurities from the recycled stream. When hydrogen of the prescribed purity is employed, the hydrogen loss in the necessary venting operation is maintained at a minimum. The necessity for using hydrogen of better than 90 percent purity and preferably better than 95 percent purity in the hydrogen reduction of iron ore is a consequence of the high recycle ratio requirement.

Since only 2 to 10 percent hydrogen is utilized per pass, it is necessary to employ a high ratio of recycle gas to fresh feed in order to utilize properly the hydrogen-reducing agent. A minimum recycle ratio of 5 is specified, but recycle ratios as high as about 25 may be used while still effecting successful commercial hydrogen reduction of iron ore. Recycle ratios between 6 and 15 are usually employed. When the reduction is effected at the afore-described conditions of fluid bed operation, temperature, pressure and hydrogen purity, the prescribed recycle ratio is readily maintained.

At the prescribed temperature and pressure conditions, the water produced during the reduction of the iron oxides to metallic iron is removed from the effluent gas in the reduction zone by cooling the effluent to a temperature in the neighborhood of 400° F. whereby better than 95 percent of the water in the gas stream is condensed and separated from the effluent hydrogen.

Successful continuous reduction of iron ore to metallic iron with hydrogen requires the absolute and complete observance of the afore-described conditions which are closely interdependent and inter-related with one another. The surprising and unexpected nature of the prescribed process is that an economical and practical commercial method for converting iron ores to metallic iron by hydrogen reduction is effected at conditions at which low conversion of iron oxide to metallic iron per hydrogen pass is realized.

In continuous operation, the rate of ore introduction into the fluid bed and the rate of reduced metal withdrawal are equated so that the amount of iron in the introduced ore and the amount of iron in the withdrawn product are equivalent. In a typical unit for producing 1,000 tons per day of metallic iron, this result is effected by a daily charge of 2,224 tons of hematite and a daily withdrawal of 1,794 tons of reduced ore, of which 1,000 tons is reduced iron metal, 634 tons is gangue and the remaining 160 tons is unreduced oxide.

The reduced ore is withdrawn from the fluid bed contact zone by conventional means such as standpipes connected with the lower portion of the fluid bed. The use of settling zones surrounding the point of entry of the standpipe has been found useful in effecting continuous removal of an equilibrium mixture of reduced ore from the fluid bed reaction zone. The withdrawn reduced mixture is treated to separate the metallic iron from the gangue which comprises mainly silica.

The process of the invention is diagrammatically illustrated in the accompanying drawing wherein the fluid bed hydrogen reduction is used in conjunction with an electric furnace.

Iron ore having an average particle size in the range of 10 to 3,000 microns and having a silica content of about 10 percent is stored in a hopper 1 which is attached by a standpipe 2 with the pipe 5 through which hydrogen, at a pressure of about 450 p.s.i.g., is obtained from a source not shown.

The hydrogen employed in the process of this invention can be obtained electrically if the ore reduction plant is located near a cheap source of electric power, but is usually obtained by the partial oxidation of carbonaceous fuel, such as natural gas, coal and heavy fuel oil, to produce a mixture of carbon monoxide and hydrogen which is subsequently converted to a higher hydrogen content carbon dioxide mixture by the water-gas shift reaction; a hydrogen stream satisfying the purity requirements of this invention is simply prepared from the hydrogen-carbon dioxide mixture by removal of the carbon dioxide by conventional means such as absorption in monoethanolamine or diethanolamine.

The iron ore particles are carried into the fluid bed reaction zone 6 by the high pressure hydrogen flowing through pipe 5.

The hydrogen is preheated to a temperature approximately 200 to 300° F. higher than the level at which the reduction of the iron ore is to be effected. For example, if the iron ore reduction is to be effected at a temperature of approximately 875° F., hydrogen at a pressure of 450 p.s.i.g. is preheated in the exchanger 4 located in the line 5 to a temperature of about 1,175° F. prior to its introduction into the reaction zone 6.

The rate at which the iron ore is introduced into the reaction zone 6 is equated with the rate at which the reduced iron is withdrawn from the reaction zone. In a reaction zone 6 having a 16-foot internal diameter and a height of 90 feet of which 71 feet is an effective bed depth, the daily charge of hematite ore is 2,224 tons per day and the daily withdrawal is 1,794 tons of reduced iron of which approximately 1,000 tons is metallic iron.

The hydrogen feed, comprising fresh hydrogen and recycle hydrogen, is charged to the reaction zone at such a rate that a superficial linear velocity of about 2 feet per second is obtained in the reaction zone. At a superficial linear velocity of this magnitude, a gas residence time calculated on the basis that the fluid bed is 67 percent voids, between about 6 and 10 seconds, is realized in the reaction zone. With iron ore particles having an average particle size of about 1,000 microns, the fluid density of the ore bed is about 150 pounds per cubic foot.

Passage of the hydrogen through the fluid bed of iron ore effects approximately 5 to 12 percent conversion of the ore per hydrogen pass. The sensible heat of the hydrogen provides the necessary endothermic heat of reaction. Maintenance of the temperature within the reaction zone at the desired level is simply effected in the process of this invention by the afore-described technique of preheating the hydrogen gas to a temperature between 200 and 550° F. higher than the level to be maintained in the reaction zone.

A series of cyclone separators represented diagrammatically by the single cyclone 10 separate entrained ore from the hydrogen gas prior to its exit from the reaction zone 6. The fines separated in the cyclone 10 are returned to the lower portion of the reaction zone 6 through the standpipe 11. Separation of the ore particles from the hydrogen stream is also expedited by constructing the reaction zone 6 with an enlarged cross-sectional area in the upper portion thereof as is shown in the drawing.

The reaction zone 6 is advantageously provided with a settling zone 12 located in the lower portion thereof to expedite separation of the reduced ore from the reaction zone in a continuous fashion. Settling zones of this type are conventional in fluid bed operation and are simply constructed by erecting a barrier 13 adjacent to one wall of the reaction zone 6.

Reduced ore is either continuously or intermittently removed from the reaction zone 6 by a standpipe 16 which communicates with the settling zone 12. Advantageously, a small stream of hydrogen is passed through the standpipe at a low rate in order to prevent excessive compacting in the settling zone and in the standpipe 16. Hydrogen for this purpose is obtained from the recycle stream through a pipe 17.

The reduced ore is introduced into an electric furnace 20 through the standpipe 16. The electric furnace 20 is of conventional design wherein the heat required to raise the reduced ore to a temperature between 2,000 and 2,500° F. is supplied electrically through carbon electrodes. Lime is introduced into the electric furnace 20 through a pipe 21. The reduced ore comprises approximately 85 percent metallic iron, 12 percent silica and the remainder unreduced oxide. The lime-containing mixture forms a molten mass at a temperature above 2,100° F. The molten mixture forms two phases, the denser of which is molten iron, while the lighter is the slag comprising mainly silicates. The molten iron metal is withdrawn from the electric furnace through a pipe 23. The molten slag is withdrawn from the electric furnace through a pipe 24.

The effluent gas which is withdrawn at a temperature of about 850° F. from the reaction zone 6 through a pipe 28 is substantially free from entrained ore particles and comprises approximately 80 percent hydrogen and 4 percent steam with nitrogen and methane comprising the remaining portion of the effluent. The effluent gas which is at a temperature of about 850° F. and at a pressure of about 375 p.s.i.g. is introduced through the pipe 28 into a heat exchanger 29 wherein it is reduced to a temperature level of about 400° F. by exchange with the recycled hydrogen stream. At this temperature level, the effluent gas is introduced through a pipe 30 into a separator 31 where it is directly scrubbed at elevated pressure with water introduced through a pipe 33.

Water scrubbing reduces the water content of the hydrogen stream to below 1 percent, and, in addition, reduces the carbon dioxide, hydrogen sulfide and carbon content of the hydrogen stream. Carbon dioxide and hydrogen sulfide can be present in the effluent stream if the iron ore contains carbonates and sulfides; carbon results from the thermal decomposition of methane which is formed by reaction between hydrogen and carbon monoxide present in the hydrogen reducing gas. Wash water is removed from the separator 31 through a pipe 32. Water scrubbing also has the effect of removing fines carried out of the reaction zone 6 by the gaseous effluent.

If the carbon dioxide and hydrogen sulfide contents of the gaseous effluent are high as a consequence of a large concentration of carbonates and sulfides in the iron ore, it may be necessary to subject the water-scrubbed hydrogen stream to additional scrubbing with monoethanolamine for removal of these acidic gases. The monoethanolamine system which can be of conventional design is not shown in the drawing because ordinarily the ores employed in the process of the invention do not possess sufficiently high sulfide or carbonate contents to necessitate its use in order to purify the recycled hydrogen stream.

The hydrogen stream whose water content has been reduced below approximately 1 percent is withdrawn from the separator 31 through a pipe 35 and passed through the exchanger 29. This gas stream is repressured to overcome the 75 p.s.i.g. pressure drop in the system and is heated to a temperature of about 1,175° F. prior to recycle to the reaction zone 6. Accordingly, the pipe 35 communicates with a compressor 37 and a heat exchanger 38 wherein the recycled gas is raised to the desired pressure and temperature levels, respectively. The recycle gas at the desired temperature and pressure, that is, about 1,175° F. and about 450 p.s.i.g., leaves the exchanger 38 through a pipe 36 and combines with the fresh hydrogen feed in the conduit 5 at such conditions to maintain a recycle ratio of about 7.

A vent 40 is provided in the recycle line 35 to purge impurities from the recycle stream. The requirement that the hydrogen have a minimum purity of 90 percent necessitates that means be provided to prevent build up of impurities, particularly in view of the high recycle ratio required in the process of the invention.

The process of this invention is further illustrated by the following examples which demonstrate its use in both large and small scale commercial units for the production of iron ore.

Example I 9.78 million cubic feet per day of natural gas is reacted at a pressure of 450 p.s.i.g. and at a temperature of 2,300° F. with 7.23 million cubic feet per day of oxygen to yield a hydrogen-carbon monoxide mixture having an approximate hydrogen to carbon monoxide mol ratio of 1.82. On subjecting this gaseous mixture to water-gas shift reaction at conventional conditions, namely, a temperature of 850° F., a pressure of about 400 p.s.i.g., and an iron catalyst, 27.5 million cubic feet per day of hydrogen is obtained. The hydrogen thus obtained is divided between two 90-foot reactors, each of which has a 16-foot diameter and a 71-foot bed depth. Hematite is charged to these reactors at a rate of 2,224 tons per day. The hydrogen is preheated to a temperature of about 1,050° F. prior to its introduction into the reaction vessels. In each reaction vessel, the ore particles are reduced at a temperature of about 850° F. by the passage of hydrogen into the reaction zone at 1.5 ft. per second inlet linear velocity, at a temperature of 1,050° F. and at a pressure of 400 p.s.i.g. The hydrogen utilization per pass, during its residence time of approximately 8 seconds, is approximately 5 percent, and the utimate hydrogen utilization is of the order of 80 to 85 percent. The effluent gas from the reaction zone is freed of the water formed during the ore reduction and is recycled at a rate such that a recycle ratio of 18 is maintained so that the hydrogen feed to the reaction zones is of the order of 543 million cubic feet per day. The recycled gas is recompressed to the 400 p.s.i.g. level and preheated to the 1,050° F. level prior to its introduction into the reactors. 1,794 tons per day of reduced ore is withdrawn from the reactors of which 1,000 tons is iron, 634 tons is gangue and the remainder is unreduced iron oxide. The reduced ore is introduced into an electric furnace after the addition of approximately 450 tons per day of lime, and the lime-reduced ore mixture is converted to a molten mass at a temperature of 2,200° F. 1,000 tons of ingot steel per day is obtained from the electric furnace and 1,046 tons per day of slag is also obtained. The unreduced ore content of this gangue is approximately 15 percent, and can be recovered therefrom by grinding and magnetic separation for return to the process of the invention.

Example II 2,500 pounds of magnetite obtained from the Alan Wood mine in Dover, New Jersey, having an average particle size of 250 microns was charged to a fluidized reduction vessel having an internal diameter of 11.75 inches and an overall height of 27 feet. Fresh hydrogen of substantially 100 percent purity was charged to the reactor at a rate of 1,550 standard cubic feet per hour. The total hydrogen feed rate was 40,891 standard cubic feet per hour, which corresponds to a recycle ratio of about 25. The inlet linear velocity of the total hydrogen charged was 1.73 feet per second. The reactor was maintained at a temperature between 900 and 970° F. and at a pressure between 375 and 410 p.s.i.g. Heat was supplied by passing hydrogen through an externally fired tubular preheater which was operated with a heater outlet temperature of 1,100 to 1,180° F. The difference in temperature between the heater outlet and the reactor bed was primarily due to the endothermic nature of the reduction reaction. Under these conditions, the iron ore was maintained in a fluidized bed in which the dense phase had an average height of 20 feet. The average residence time of the hydrogen in contact with the iron ore was 4.8 seconds. The effluent gas from the reaction zone was freed of the water formed during the ore reduction by cooling, was recompressed and recycled through the hydrogen preheater. After 8 hours of batch operation under these conditions, the iron oxide content of the ore was reduced 95 percent to metallic iron with an average hydrogen conversion per pass over this period of about 4 percent. At the termination of the run, the reactor was emptied and a mixture comprising 1,658 pounds of metallic iron, 120 pounds of unreduced iron oxides and 141 pounds of gangue (primarily silica) was recovered. The separation of the reaction product into its components was effected by fusion in an electric furnace as previously described.

Obviously, many other modifications and variations of the invention as hereinbefore set forth may be made without departing from the spirit and scope thereof, and, therefore, only such limitations should be imposed as are indicated in the appended claims.

I claim:
1. A process for effecting reduction of iron oxide to metallic iron, which comprises passing hydrogen of at least 90 percent purity upwardly through a body of said iron oxide in finely divided particle form in a vertically extended unobstructed reduction zone at a temperature between 700 and 1,050° F. and at a pressure in the range of 250 to 650 pounds per square inch gauge, withdrawing an effluent gas from said reduction zone, removing water from said effluent gas to below 1 percent, recompressing said effluent gas to a pressure of at least 250 pounds per square inch gauge, heating said repressured effluent gas to a temperature above that maintained in said reduction zone, and passing said heated repressured effluent recycle gas together with said fresh feed hydrogen of at least 90 percent purity into said reduction zone in relative proportions such that at least 5 volumes of recycle gas to each volume of fresh hydrogen feed is maintained, the superficial linear velocity of said fresh feed hydrogen together with said recycle gas through said body of iron ore being between 0.5 and 5 feet per second such that said body is maintained as a fluidized bed in a dense turbulent state resembling a boiling liquid with minor carryover of solids, and withdrawing a reaction product containing metallic iron from said reduction zone.

2. A process according to claim 1 in which the particulate iron ore contacted with hydrogen has a particle size between 10 and 3,000 microns.

3. A process according to claim 1 in which fluidized bed of iron oxide particles has an effective depth of at least 20 feet.

4. A process according to claim 1 in which the temperature is maintained between 850 and 1,000° F.

5. A process according to claim 1 in which the recompression pressure is between 400 and 550 p.s.i.g.

6. A process according to claim 1 in which the hydrogen employed to contact the particulate iron oxide is preheated to a temperature 200 to 550° F. higher than the temperature within said prescribed 700 to 1,050° F. range.

References Cited in the file of this patent

UNITED STATES PATENTS

| | | |
|---|---|---|
| 2,479,435 | Vesterdal | Aug. 16, 1949 |
| 2,638,414 | Lewis | May 12, 1953 |
| 2,671,765 | McGrath et al. | Mar. 9, 1954 |

OTHER REFERENCES

Sphect, Jr., et al.: The Low Temperature Gaseous Reduction of Magnetite Ore to Spinge Iron, Transactions American Institute of Mining and Metallurgical Engineers, vol. 167, pages 237–262, 1946.

UNITED STATES PATENT OFFICE
CERTIFICATE OF CORRECTION

Patent No. 3,022,156                        February 20, 1962

Du Bois Eastman

It is hereby certified that error appears in the above numbered patent requiring correction and that the said Letters Patent should read as corrected below.

Column 1, line 9, strike out "a"; line 23, for "350" read -- 250 --; column 2, line 33, for "is", first occurrence, read -- it --; column 3, line 67, for "hyrogen" read -- hydrogen --.

Signed and sealed this 12th day of June 1962.

(SEAL)
Attest:

ERNEST W. SWIDER                        DAVID L. LADD
Attesting Officer                        Commissioner of Patents